United States Patent [19]
White et al.

[11] Patent Number: 4,458,809
[45] Date of Patent: Jul. 10, 1984

[54] PADDED CHAIN CONVEYOR DRIVE

[75] Inventors: Oscar M. White, Wyoming; Gerald A. Brouwer, Grandville, both of Mich.

[73] Assignee: Lear Siegler, Inc., Grand Rapids, Mich.

[21] Appl. No.: 278,630

[22] Filed: Jun. 29, 1981

[51] Int. Cl.³ .............................................. B65G 13/07
[52] U.S. Cl. ...................................... 198/790; 198/789
[58] Field of Search ............... 198/790, 851, 833, 783, 198/787, 853

[56] References Cited

U.S. PATENT DOCUMENTS 2,792,928  5/1957  Holz .................................. 198/853
3,189,161  6/1965  Schneider et al. ................... 198/787
4,074,805  2/1978  Bodewes ............................. 198/790

Primary Examiner—Robert J. Spar
Assistant Examiner—Jonathan D. Holmes
Attorney, Agent, or Firm—Price, Heneveld, Huizenga & Cooper

[57] ABSTRACT

A conveyor drive chain is equipped with pads of a high friction, resilient material. Each pad has a body secured to and overlying one link of the chain and has an extension at each end overlying the adjacent chain link. The extensions are wedge shaped, lengthwise of the chain, having one side face extending at an angle to the axis of the chain whereby the extension portions of two adjacent pads are seated side-by-side with the line of separation between them laterally inclined across the chain.

12 Claims, 7 Drawing Figures

PADDED CHAIN CONVEYOR DRIVE

FIELD OF THE INVENTION

This invention relates to powered conveyors and, more particularly, to an improved propelling member for powering such a conveyor, which propelling member consists of a primary, high strength, tension load-carrying chain and a padding which provides a high friction, non-metallic roller or article contacting surface for the propelling member.

BACKGROUND OF THE INVENTION

Over the years, various combinations of chain and rubber or plastic pads or belts have been devised and used in the conveyor field. These have included devices in which the pad or high friction member is a continuous band, similar to a belt, which is mounted on the chain. Other devices include individual pads, one of which is mounted on each link of the chain, or pads of greater length designed to overlay a number of adjacent links of the chain. Examples of these types of construction are found in patents such as U.S. Pat. No. 2,792,928 entitled "Attachment Clip For Lumber Conveyor Chains" issued May 21, 1957 to W. G. Holz; U.S. Pat. No. 3,189,161 entitled "Powered Roller Curve" issued June 15, 1965 to D. A. Schneider et al; U.S. Pat. No. 3,306,430 entitled "Belt-Chain Combination Drive" issued Feb. 28, 1967; and U.S. Pat. No. 4,074,805 entitled "Installation Equipment With A Driving Mechanism" issued Feb. 21, 1978 to Bodewes.

While each of the constructions disclosed by the preceding patents has various merits, these pad and chain combinations have not been entirely satisfactory. While they have provided the advantage of the strength of a chain and the high frictional characteristics of the rubber or plastic pad, they have failed to solve the problem of excessive noise. They have also failed to solve the problem of quick and inexpensive replacement when sections of the pad are damaged, lost, or excessively worn. Despite these shortcomings, the advantage of this type of a combination has been recognized and as a result has been extensively used because the combination provides a propelling member or drive which has wear characteristics much improved over belts, and eliminates the dual problems of tracking and stretch, which are experienced with even the best belt-driven conveyor system.

BRIEF DESCRIPTION OF THE INVENTION

The invention provides individual pads which are secured to the chain with each pad being so shaped that it has a portion at each end overlaying at least one other link than the one to which it is attached. Further, each of the ends is shaped such that it tapers to a point, thus producing a line of separation between it and the end of the next adjacent pad that is at a bias to the axis of the chain. In this manner, as the chain and pads are moved beneath the rollers of the conveyor, the transition from one pad to the other is gradual and there is no abrupt or sudden transfer to produce either noise or interruption or variation in the motion transmitted to the roller. While the ends of the individual pads are radiused to facilitate the transit about the drive sprockets at the ends of the runs of the chain, because of the overlap and the gradual transition created by the biased line of demarcation between the individual pads, this radiusing has no affect upon the drive of the rollers.

DESCRIPTION OF THE PREFERRED EMBODIMENT

Figure 1:
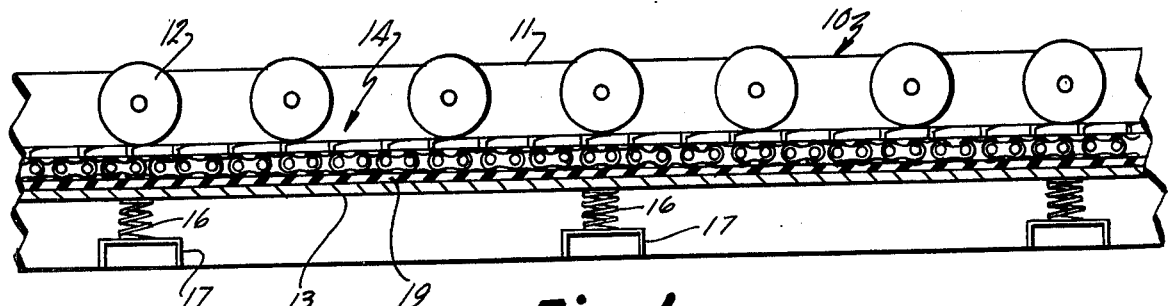
FIG. 1 is a fragmentary, sectional, elevation view of a conveyor equipped with this invention with the side of the track supporting the chain removed for clarity.
Figure 4:
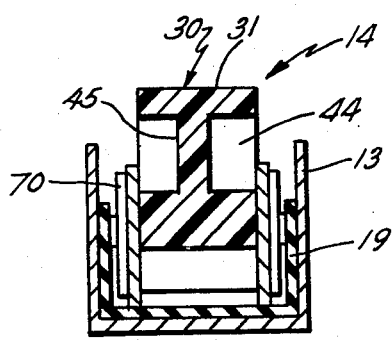
FIG. 4 is a sectional elevation view taken along the plane IV—IV of FIG. 3 showing the propelling member nested in its supporting channel.
Figure 7:
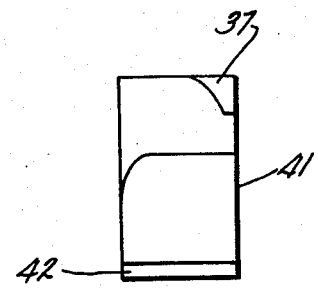
FIG. 7 is an end view of one of the pads of this invention.

Referring to FIG. 1, the numeral 10 indicates a conveyor having sides 11 between which are rotatably mounted a plurality of rollers 12 which, collectively, provide an article conveying surface. Beneath the rollers is a channel 13 providing a guide and support for the propelling member 14 (FIGS. 1 and 4). The channel 13 has a liner 19 to provide a wear resistant, low friction surface for guiding and supporting the propelling member 14. The channel 13 and thus the propelling member 14 can be supported in any suitable, conventional manner such as by the springs 16 which rest on the crosspieces 17 of the conveyor frame. All of the structure which has been described is conventional and has long been used in the conveyor art.

Figure 2:
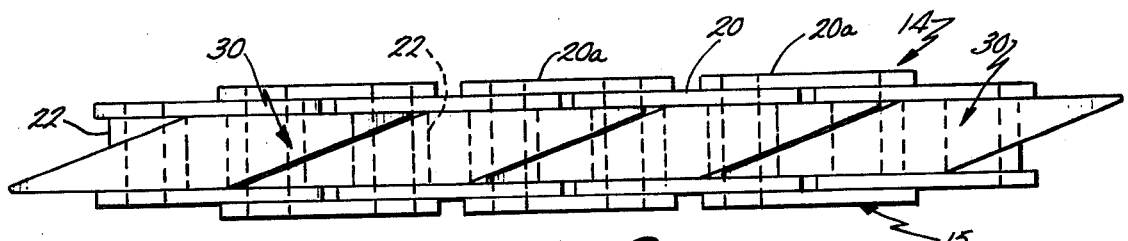
FIG. 2 is a fragmentary, enlarged plan view of the chain and pad combination of this invention.
Figure 3:
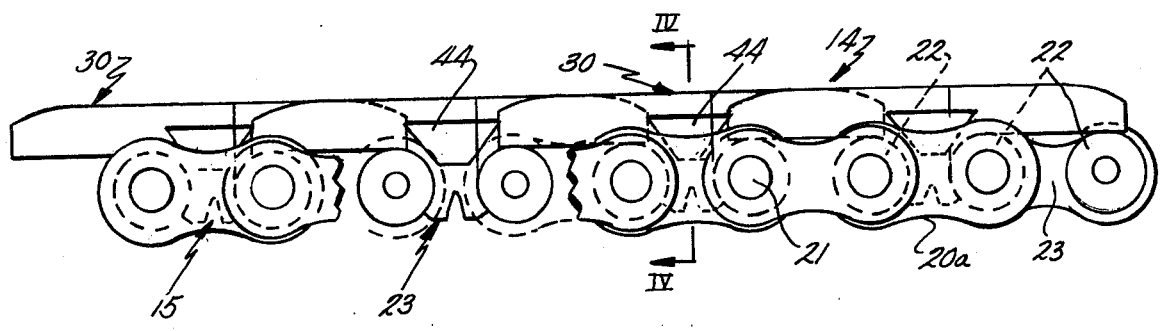
FIG. 3 is a fragmentary, enlarged partially broken side view of the chain equipped with the pads of this invention.

As best seen in FIGS. 2 and 3, the propelling member 14 has a chain 15 of conventional construction consisting of links 20 and 20a pivotally joined together by pins 21 surrounded by roller sleeves 22. Each link, between the roller sleeves 22 at its opposite ends, provides an opening 23 of somewhat hourglass shape (FIG. 3). This type of chain is conventional and when designed for lighter duty, it is commonly marketed as bicycle chain. This type of chain has been used for many years in the conveyor industry.

Figure 5:
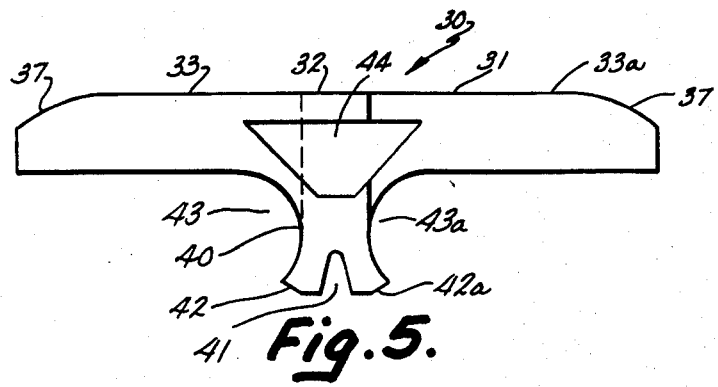
FIG. 5 is a side elevation view of one of the pads of this invention.
Figure 6:
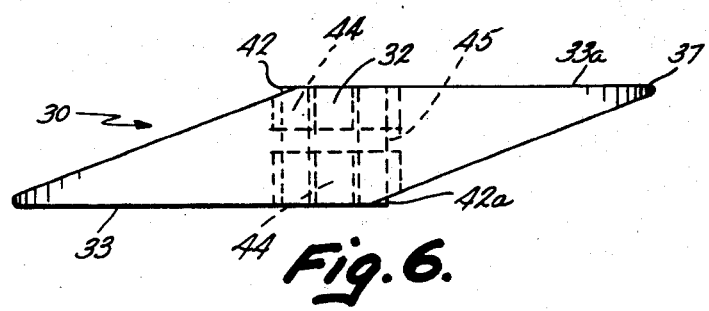
FIG. 6 is a plan view of one of the pads of this invention.

Mounted to the chain are a plurality of pads 30. Each pad has a primary body portion 31 including a central section 32 and a pair of end portions 33 and 33a (FIG. 5). The central portion extends the full width of the opening 23 between a pair of the sides forming one of the links 20a and also the length of the opening 23 which corresponds substantially to the spacing between a pair of the roller sleeves 22. Each of the ends extends lengthwise of the chain sufficiently to overlap the remainder of the link to which the pad is attached and to overlap all or almost all of the next adjacent link. Each of the ends 33 and 33a is tapered by having one side extending parallel to the sides of the chain and the other side inclined in an oblique angle to the longitudinal axis of the chain whereby each end gradually tapers to a point lengthwise of the chain. Opposite ends of the same pad are tapered on opposite sides whereby the vertical planes of the inclined sides of each link are parallel, thus producing a pad having a top shape which is generally that of an oblique parallelogram. The top surface of the pad is flat except at the very tip ends of the end portions which are downwardly radiused at 37 to reduce or eliminate the problem of the ends projecting up any significant distance from the remaining surface of the propelling member as the pad and the chain pass around the pulleys at the end of each run.

Projecting from the bottom of the center section of each pad is an anchor member or stem 40. The stem 40 is of the full width of the pad and its lower end is bifurcated at 41 to form a pair of fingers 42 and 42a. The fingers flare lengthwise of the pad toward the end portions 33 and 33a and thus produce recessed pockets 43 and 43a on opposite sides of the anchor member. The pockets 43 and 43a are of a size and shape to snugly and firmly receive and seat against and around the roller sleeves 22 at the ends of the chain link to which the pad is secured. It will be noted that the bifurcation slot 41 separating the fingers 42 and 42a is V-shaped. This facilitates the compression or squeezing together of the fingers 42 and 42a when the stem is inserted through the opening 23 in one of the chain links.

The central section 32 has a pair of blind openings 44, one on each side. The combined depths of the openings 44 is less than the width of the pad leaving a longitudinal central web 45. These openings facilitate molding of the pad by helping to control shrinkage which produces sink marks in the surface due to differentials in shrinkage between sections of substantially different wall thickness. The central web 45 provides continuous longitudinal support for the pad's surface.

The pad is preferably molded from a material having high resistance to scuff and wear and also having a high coefficient of surface friction. The material must have a limited degree of resilience to permit it to cooperate with the chain and also to permit it to be installed on the chain. A preferred material for the manufacture of the pads is a moldable urethane, for example, urethane marketed by E. I. Dupont de Nemoirs under the trademark "Hytrel".

It will be recognized that the invention provides a continuous surface so far as each individual driven roller is concerned contacted by the propelling member. The transfer of the roller from one pad to another is gradual, as the sloping line of separation or demarcation passes beneath the roller. Thus, there is nothing to bounce or vibrate the roller and its movement is continuous, and the noise incident to a transverse separation line between pads passing under a roller is eliminated. This makes it practical to utilize individual pads of short length. This is particularly desirable because such pads are easier and simpler to install and do not have a tendency to separate from the chain as the propelling member passes around the drive pulleys. Also, as normally occurs with any chain, there is, over a period of time, a stretching of the chain due to wear and other factors. Since each pad is secured to one link only, and bridge the surface of only a short length of the chain, this stretching of the chain has no adverse affect upon the pads. Even if it causes some increase in the gap between links, this will not cause trouble because the long overlap between links will prevent any increase in noise or change in roller operational characteristics. Chain stretch has been a problem where long pads were utilized which were continuous for a number of links because, while the chain stretched, the pads did not stretch correspondingly, and thus there was a tendency for the pads to pull loose from the chain as the hours of usage of the chain increased. Another problem encountered with long pads has been the stretching of the pads as the chain/pad combination passes around the pulleys due to the increase in path length for the pads because of the increased radius of their path of travel. This alternate stretching and contracting not only materially increases pad wear, it also causes the pads to pull free of the chain.

The arrangement is also particularly desirable because it renders immaterial the length of the chain since the pads are installed one by one. It is also true that the pads can be quickly, easily and relatively inexpensively replaced as needed.

It will be recognized that while a preferred embodiment of the invention has been described, that other embodiments can be made without departing from the principles of the invention. Such modifications are to be considered as included in the hereinafter appended claims unless these claims by their language expressly state otherwise.

The embodiments of the invention in which an exclusive property or privilege is claimed are defined as follows:

1. A propelling member for a conveyor, said member comprising a roller chain and a flexible element secured thereto for forming a high friction driving surface, said element comprising a plurality of individual pads arranged in tandem, each pad including an integral anchor member extending between a pair of adjacent rollers of said chain for securing said pad to said chain, said pads overlapping in a side-by-side relationship, each pad overlying said pair of adjacent rollers and a portion of each roller adjacent said pair of adjacent rollers, said pads being shaped to form generally straight lines of separation between pads at an oblique angle to the longitudinal axis of said chain whereby each end of each pad overlaps an end of each adjacent pad, each of said pad ends being radiused downwardly away from said driving surface along a longitudinally extending arc to reduce the height of the overlapping pad ends to facilitate load transfer between pads and thereby reduce noise.

2. A propelling member as described in claim 1 further characterized in that each end of each of the pads is radiused away from its driving surface for a longitudinal distance not exceeding the extent of overlap with the adjacent pad.

3. A propelling member as described in claim 1 further characterized in that said pads are fabricated of a resilient material and each anchor member includes a bifurcated end forming a pair of fingers which resiliently seat around said pair of adjacent rollers on the side opposite from said driving surface.

4. A propelling member as described in claim 1 further characterized in that said pads are fabricated of a resilient material and each of said anchor members includes a bifurcated end forming a pair of oppositely extending fingers, whereby said end can be compressed and passed between said pair of adjacent rollers and capable of reexpanding when the pad is fully seated to partially wrap around said pair of rollers to pull the pad tightly against the chain.

5. A propelling member as described in claim 1 wherein each pad includes a pair of laterally extending openings therein centered between the ends of said pad and adjacent the juncture of said main body and said mounting stem, said openings being blind and forming a longitudinally extending web therebetween for supporting the driving surface of said pad.

6. A flexible pad as described in claim 5 wherein said openings are trapezoidal in shape.

7. A propelling member for a conveyor, said member having a roller chain and a flexible element secured thereto and forming a generally flat high friction driving surface, said element characterized in that it comprises a plurality of individual pads arranged in tandem, each pad being of oblique parallelogram shape and overlying a plurality of rollers of said roller chain with the ends of each pad overlapping each other lengthwise of said chain in a side-by-side relationship, each pad including means for securing said pad to said roller chain, each of said pad ends being of reduced cross-sectional height to facilitate load transfer between pads and reduce noise as loads are transferred therebetween.

8. A propelling member for a conveyor as described in claim 7 further characterized in that the longitudinal extent of said reduced height of each end of each of the pads does not exceed the extent of overlap with the adjacent pad.

9. A flexible pad for attachment to a roller drive chain for a conveyor, said pad having a main body forming a driving surface of generally oblique parallelogram shape with a central section and opposite ends each tapered lengthwise, the ends of adjacent pads being arranged side-by-side lengthwise of the chain for forming a generally flat driving surface, the degree of taper being such that the length of each taper is greater than the width of the pad such that the extent of side-by-side overlap is greater than the pad width; a mounting stem extending from the opposite face of said central section for securing said pad to said roller chain; each of said pad ends tapering downwardly in height from said driving surface to facilitate load transfer between pads and reduce noise, said pad being molded as a single piece from a flexible, wear resistant material having a high coefficient of friction.

10. A flexible pad as described in claim 9 further characterized in that the end of said stem is bifurcated and has a pair of fingers extending divergently from each other lengthwise of said pad for gripping the chain rollers.

11. A flexible pad as described in claim 10 further characterized in that said pad ends are radiused downwardly away from said driving surface along a longitudinally extending arc.

12. A flexible pad as described in claim 10 further characterized in that said pad has a pair of laterally extending openings therein centered between the ends of said pad and adjacent the juncture of said main body and said mounting stem, said openings being blind and forming a longitudinally extending web therebetween for supporting the driving surface of said pad.

* * * * *